United States Patent [19]

Nakayama et al.

[11] Patent Number: 4,973,104
[45] Date of Patent: Nov. 27, 1990

[54] CAR SEAT

[75] Inventors: Keiji Nakayama; Shinobu Imai; Touru Kondo; Shoji Mizuno, all of Ayase, Japan

[73] Assignee: Ikeda Bussan Co., Ltd., Ayase, Japan

[21] Appl. No.: 316,963

[22] Filed: Feb. 28, 1989

[30] Foreign Application Priority Data

Feb. 29, 1988 [JP] Japan .............................. 63-25143[U]
Mar. 15, 1988 [JP] Japan .............................. 63-33268[U]

[51] Int. Cl.⁵ .............................................. B60N 1/04
[52] U.S. Cl. ..................................... 297/341; 297/355
[58] Field of Search ......................................... 297/341

[56] References Cited

U.S. PATENT DOCUMENTS

| | | | |
|---|---|---|---|
| 3,940,182 | 2/1976 | Tamura | 297/341 |
| 4,159,147 | 6/1979 | Kiyomitsu | 297/341 |
| 4,615,551 | 10/1986 | Kinaga | 297/341 |
| 4,813,741 | 3/1989 | Miyauchi | 297/341 |

Primary Examiner—Peter R. Brown
Attorney, Agent, or Firm—Foley & Lardner, Schwartz, Jeffery, Schwaab, Mack, Blumenthal & Evans

[57] ABSTRACT

A car seat comprising a seat slide mechanism, a seat reclining mechanism and, walk-in system. The walk-in system is provided with a wire to unlock the seat slide means and the wire is arranged to loosen when the seat-back is swung backward by the reclining mechanism.

4 Claims, 3 Drawing Sheets

CAR SEAT

BACKGROUND OF THE INVENTION

1. Field of the Invention

The present invention relates to a car seat provided with a walk-in system.

2. Prior Art

Some of two-door cars have a walk-in system to make it easy for persons to get in onto the rear seats and the walk-in system serves to unlock a locking mechanism of a seat slide means which slidably supports a seat cushion to a vehicle floor and cause it to automatically slide forward when the seat-back of one of the front seats is collapsed forward. Each of the front seats in these cars usually have a reclining means to swing the seat-back backward in relation to the seat cushion.

When the reclining means is of the type of its being steplessly adjusted or keeping its gears engaged with each other at all times, the seat-back cannot be usually collapsed forward onto the seat cushion. In order to enable the seat-back to be collapsed onto the seat cushion in this case, the front end of the base for the reclining means is rotatably attached to one side of the seat cushion through a shaft. The seat-back is thus collapsed forward, swinging around the shaft. When the reclining means is of the type of its being adjusted step by step, same arrangement is sometimes employed because space large enough to make it easy for persons to get in onto the rear seats can be provided behind the front seat when the seat-back of one of the front seats is collapsed forward.

FIG. 1 shows the conventional car seat provided with the walk-in system which has the above-described arrangement. A seat cushion 1 is supported, slidably forward and backward, on a car floor through a seat slide means 2. The lower end of a seat-back 3 is attached, swingably forward and backward, to the back end of the seat cushion 1 through a reclining means 4. An arm 5 of the reclining means 4 is fixed to one side of the seat-back 3 and a base 6 is swingably attached to one side of the seat cushion 1 by means of a shaft 7. A recess 9 is provided at the lower side of the base 6 so that a rod-like striker 8 projecting laterally from the side of the seat cushion 1 is engaged with the recess 9 and a latch 10 to hold striker 8 in cooperation with the recess 9 is swingably attached to the base 6. The latch 10 is energized toward the striker 8 by means of a spring (not shown) and is connected to a knob 12 attached on the side of the seat-back 3 through a wire 13. A wire holder member 14 is fixed to the shaft 7 at the front end of the base 6 and one end of a wire 15 is connected to the lower end of the wire holder member 14 while the other end thereof to a locking mechanism 2a of the seat slide means 2. The above-mentioned parts cooperate with one another to form a walk-in system 16.

Seat slide and reclining means 2 and 4 can be used independently of each other to adjust the seat to fit a person who sits on the seat. When the walk-in system 16 is to be made operative, knob 12 on the side of the seat-back 3 is operated to pull the latch 10 and when the latch 10 is released from the striker 8, the seat-back 3 is collapsed forward around the shaft 7. The seatback 3 is thus swung together with the locked reclining means 4 around the shaft 7 at the front end of the base 6 and the wire 15 is pulled by the wire holder member 14, to unlock the locking mechanism 2a of the seat slide means 2, so that the seat cushion 1 can be forwarded to its most frontal position by means of a spring (not shown). When the seat-back 3 is swung backward after person(s) gets in onto the rear seats, the seat cushion 1 slides backward at the same time, the latch 10 is returned to hold the striker 8 in cooperation with the recess 9 of the base 6, and the wire 15 is pulled back to lock locking mechanism 2a of the seat slide means 2.

In the case of the car seat provided with the above-described walk-in system 16, the reclining means 4 can be independently adjusted. The angle of the wire holder member 14 swung in a case where the seatback 3 is moved from its normal position P to its forward collapsed position Q is different from that in another case where the seat-back 3 is moved from its backward collapsed position R, which is swung more backward than the normal position P to its forward collapsed position Q. The distance of the wire 15 pulled is thus made different in these both cases. The seat of this kind is designed to unlock the locking mechanism 2a the seat slide means 2 when the wire 15 is backward while collapsing the seat-back 3 forward from its normal position P. When the seatback 3 is moved from its backward collapsed position R to its forward collapsed position Q, the distance of the wire 15 pulled is made longer as compared with the case where the seat-back 3 is moved from its normal position P to its forward collapsed position Q. When this movement of the seat-back 3 from its backward swung position R to its forward collapsed position Q is forcedly carried out, it may happen that the wire 15 would become undurable against the applied force and that related parts would be broken by the force applied in the worst case.

SUMMARY OF THE INVENTION

The object of the present invention is to provide a car seat having a walk-in system and capable of avoiding an excessive pulling distance of a wire to unlock a locking mechanism of a seat slide means.

A car seat of the present invention comprises a seat cushion, a seat slide means for slidably supporting the seat cushion forward and backward in relation to a car floor and including a locking mechanism for locking or unlocking the sliding of the seat cushion, a seat back, a reclining means for swingably attaching the seatback forward and backward to the seat cushion a walk-in system for collapsively attaching the seatback forward to the seat cushion and for unlocking the sliding of the seat cushion, wherein the walking system includes a wire to be pulled to unlock the locking mechanism of the seat slide means when the seatback is collapsed forward by the walk-in system, and means for loosening the wire of the walk-in system when the seatback is swung backward by the reclining means.

When the seat-back is swung backward by the reclining means from its normal position, the wire thus so loosens as to correspond to the position of the seat-back. When the seat-back is, by the walk-in system collapsed forward from the backward swung position, the loosened wire is tightened at first and the wire is then pulled by a constant distance to unlock the sliding means as if the seat-back were collapsed from its normal position. No unreasonable force is applied to the wire and related parts, accordingly. This makes it possible to provide a car seat having a walk-in system easy in operation and high in reliability.

DETAILED DESCRIPTION OF THE PREFERRED EMBODIMENTS

Figure 1:
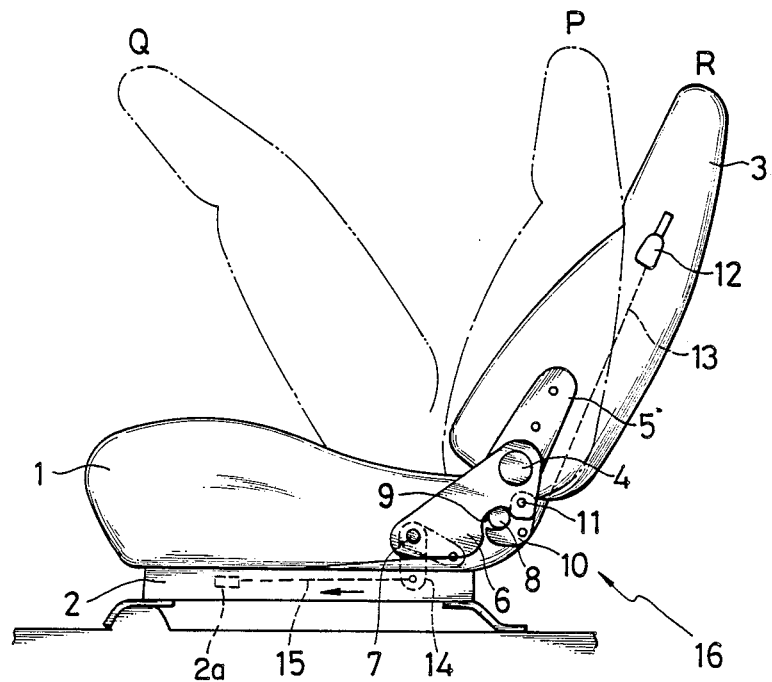
FIG. 1 is a side view showing an example of the car seat provided with the conventional walk-in system.
Figure 2:
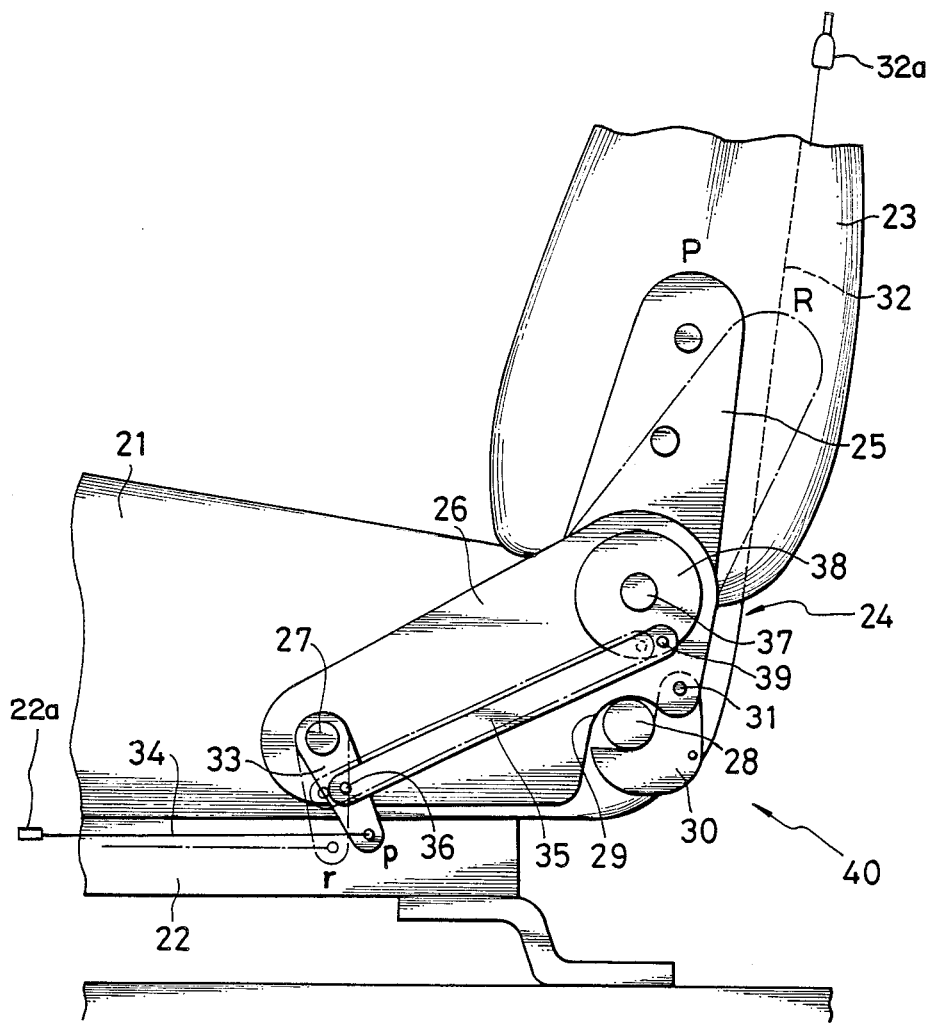
FIG. 2 is a side view showing a first example of the car seat according to the present invention.

FIG. 2 shows the main portion of an embodiment of the present invention wherein the seat itself is same in fundamental arrangement as the conventional one shown in FIG. 1.

A seat cushion 21 is supported slidably forward and backward, on a car floor through a seat side means 22. The lower end of a seat-back 23 is attached, swingably forward and backward, to the back end of the seat cushion 21 through a reclining means 24.

The reclining means 24 includes a base 26 whose front end is swingably attached to one side of the seat cushion 21 by a shaft 27, an arm 25 swingably attached to the base by a hinge pin 37 and fixed to one side of the seat-back 23, and teeth (not shown) located between the arm 25 and the base 26 and engaged with and released from each other. Accordingly, the seatback 23 is swingably attached to the seat cushion 21 around the hinge pin 37 of the reclining means 24.

A recess 29 is formed at the lower side of the base 26 so that a rod-like striker 28 projected laterally from the side of the seat cushion 21 is engaged with the recess 29 and a latch 30 is swingably attached to the base by means of a pin 31 to hold the striker 28 in cooperation with the recess 29. The latch 30 is energized toward the striker 28 by a spring (not shown) and connected to a knot 32a on the side of the seat-back 23 by means of a wire 32. The base of a wire holder member 33 is swingably attached to the shaft 27 at the front end of the base 26 and one end of a wire 34 is connected to the lower end of the wire holder member 33 while the other end thereof to a locking mechanism 22a of the seat slide means 22. One end of a link 35 is pivoted on the intermediate portion of the wire holder member 33 while the other end thereof is pivoted on the peripheral of a disc member 38 by a pin 39 and said disc member 38 is fixed to the hinge pin 37 at the base of the arm 25 The above-described parts serve to form a walk-in system 40.

The distance from the center of the hinge pin 37 to the center of the shaft 27 is substantially equal to that from the center of the pin 39 to the center of the pin 36 and the distance from the center of the hinge pin 37 to the center of the pin 39 is also substantially equal to that from the center of the shaft 27 to the center of the pin 36. These members thus form a parallel link system and when the seatback 23 is swung by means of the reclining means 24 together with the hinge pin 37 from the position (P) to the position (R), the disc member 38 is also swung together with the hinge pin 37 by a same angle as that to which the seat-back 23 is swung from the position (f) to the position (p) while the wire holder member 33 is swung through the link 35 by the same angle.

The link 35 may be connected to the arm 25 by a rod-like link member instead of the disc member 38 or it may be connected directly to the arm 25. The parallel link system is not necessarily needed but various kinds of four-bar linkage may be used if necessary.

When the seat-back 23 is collapsed forward by means of the walk-in system 40, pulling the latch 30 by the knob on the side of the seat-back 23 to release the latch 30 from the striker 38, the seat-back 23 is swung around the shaft 27 at the front end of the base 26 together with the locked reclining means 24, the wire 34 is pulled by the wire holder member 33, which is fixed to the reclining means 24 by the link 35, to unlock the locking mechanism 22a the seat slide means 22 and the seat cushion 21 slides forward to its most frontal position by means of a spring (not shown).

As described above, the seat of this kind is designed to unlock locking mechanism 22a the seat slide means 22 when the seat-back 23 is swung forward from its normal position P and the wire 34 is pulled by a certain distance. When the seat-back 23 is, by the realizing means 24, swung backward from its normal position P to its backward collapsed position R in this embodiment of the present invention, the wire holder member 33 is swung forward from a position (p) to a position (r) by the link 35, corresponding to the angle by which the seat-back 23 is swung backward. The wire 34 is 16y the system 40 thus loosened. When the seat-back 23 is swung forward from its backward collapsed position R around the shaft 27, releasing the latch 30 from the striker 28 and keeping the reclining means 24 locked, the loosened wire 34 is pulled at first by the wire holder member 33 which moves from the position (r) to the position (p). When the seat-back 23 is moved to its normal position P and further swung forward from its normal position P, the wire 34 is tightened and then pulled by the certain distance to unlock the locking mechanism 22a the seat slide means 22. In whatever position the seat-back 23 may be kept as its backward collapsed position R, the wire 34 is pulled at all times by the constant distance to unlock the locking mechanism 22a the seat slide means 22 as if the seat-back 23 were swung forward from its normal position P. This prevents excessive pulling force from being applied to the wire 34.

Figure 3:
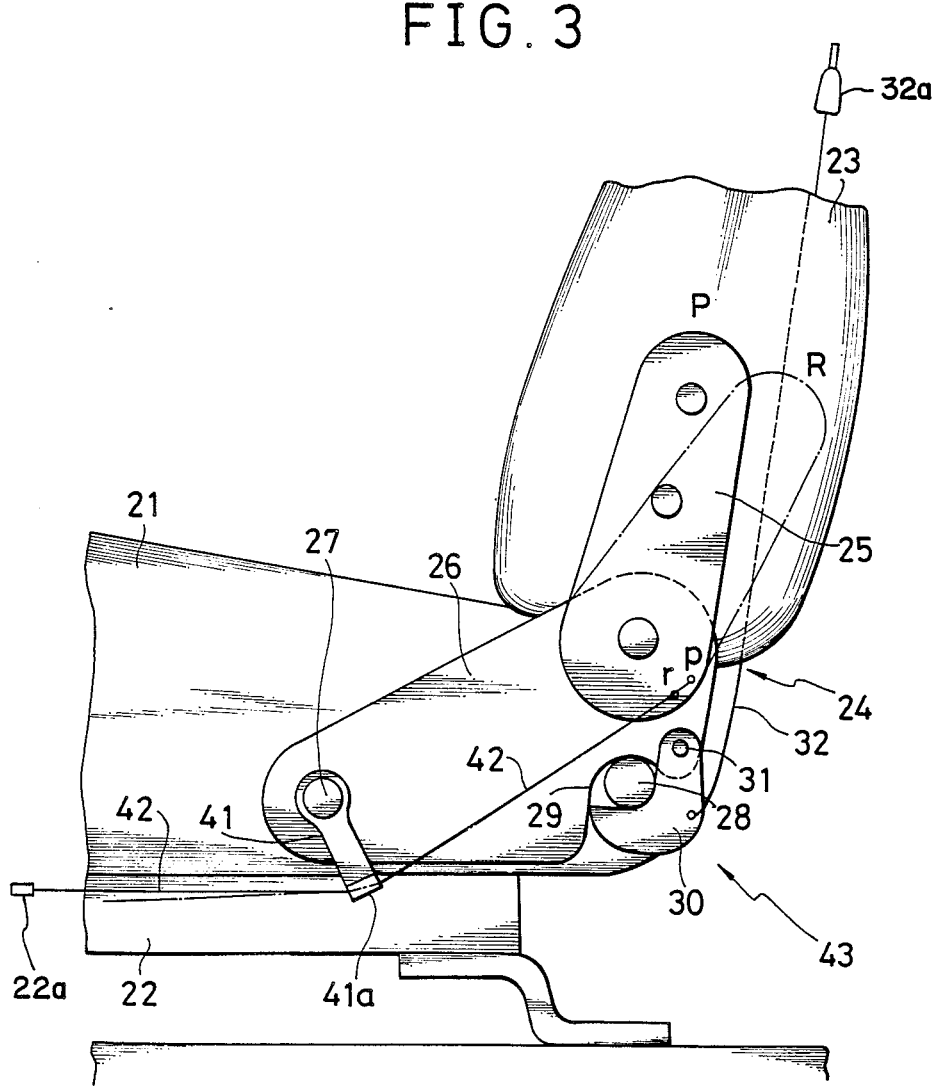
FIG. 3 is a side view showing a second example of the car seat according to the present invention.

FIG. 3 shows the main portion of a second embodiment of the present invention.

The seat cushion 21 is supported slidably forward and backward, on a car floor through the seat slide means 22. The lower end of the seat-back 23 is attached, swingably forward and backward, to the back end of the seat cushion 21 through the reclining means 24. The arm 25 of the reclining means 24 is fixed to one side of the seat-back 23 and the base 26 is swingably attached to one side of the seat cushion 21 by the shaft 27 at the front end thereof. The recess 29 is formed at the lower side of the base 26 so that the rod-like striker 28 projected laterally from the side of the seat cushion 21 is engaged with the recess 29 and the latch 30 is swingably attached to the base 26 by the pin 31 to hold the striker 28 in cooperation with the recess 29. The latch 30 is energized toward the striker 28 by means of a spring (not shown) and connected to the knob on the side of the seat-back 23 by the wire 32. The base of a rod-like wire holder member 41 is fixed to the shaft 27 at the front end of the base 26 and a sleeve 41a serving to guide a wire 42 and extending in a direction perpendicular to the longitudinal direction of the wire holder member 41 is attached to the lower end of the wire holder member 41. One end of the wire 42 is fixed to the base of the arm 25 of the reclining means 24 while the other end thereof is connected to the locking claw of the seat slide means 22. It may be arranged that the wire holder member 41 is attached directly to the front end of the base, that one end of the wire 42 is fixed to the base of the arm 25 through another attachment member, and that the other end of the wire 42 is connected to the locking mechanism through another member. The above-mentioned parts serve to form a walk-in system 43.

When the seat-back 23 is moved forward by the walk-in system 43, pulling the latch 30 by the knob on the side of the seatback 23 to release the latch 30 from the striker 28, the seatback 23 is swung around the shaft 27 at the front end of the base 26 together with the locked reclining means 24, the wire 42 fixed to the arm 25 of the reclining means 24 is pulled while being guided by the wire holder member 41 to unlock the locking mechanism of the seat slide means 22, and the seat cushion 21 slides to its most frontal position by means of a spring (not shown).

As described above, the seat of this kind is designed to pull the wire by a constant distance to unlock by the locking mechanism of the seat slide means 22 when the seat-back 23 is by the walk-in system 43, collapsed forward from its normal position P. When the seat-back 23 is by the reclining means 24, swung backward from its normal position P to its backward collapsed position R in this embodiment of the present invention, the wire loosens from a position (p) to a position (r), corresponding to the position of seat-back 23 swung backward by the reclining means When the seat-back 23 is, by the walk-in system 43, swung forward from its backward collapsed position R around the shaft 27, releasing the latch 30 from the striker 28 and keeping the reclining means 24 locked, the loosened wire 42 is pulled at first until the seat-back 23 comes to its normal position P, and the wire 42 is then pulled by the constant distance to unlock the locking mechanism 22a of the seat slide means 22. Wherever the seat-back 23 is positioned by the reclining means 24, the wire 42 is pulled by the constant distance in any case to unlock the locking mechanism 22a of the seat slide means 22 when the seat-back 23 is by the walk-in system 43, collapsed forward onto the seat cushion 21 from its backward collapsed position R. This prevents excessive pulling force from being applied to the wire 42.

What is claimed is:

1. A car seat comprising:
   a seat cushion;
   a seat slide means for slidably supporting the seat cushion forward and backward in relation to a car floor, said seat eslide means including a locking mechanism for locking or unlocking the sliding of the seat cushion;
   a seat-back;
   a reclining means including an arm fixed to said seat-back for swingably attaching the seat-back in a forward and backward direction relative to the seat cushion around a first axis, said first axis being positioned at a backward end of a base attached to the seat cushion;
   a walk-in system including said base and pivotally mounted to said seat cushion about a second axis being positioned at a forward end of said base for collapsively attaching the seat-back and the reclining means to the seat cushion around said second axis to a predetermined forward position and for unlocking the sliding of the seat cushion, said walk-in system including a wire to be pulled to unlock the locking mechanism of the seat slide means when the seat-back is collapsed forward around the second axis; and
   loosening means interconnecting said reclining means and said walk-in system and offset from said first and second axis for loosening the wire of the walk-in system when the seat-back is swung backward around the first axis by the reclining means so that a pulling distance of the wire stays constantly in each position of inclination of the seat-back when the seat-back is collapsed forward around the second axis by the walk-in system to the predetermined position.

2. A car seat according to claim 1, wherein the loosening means includes:
   a wire holder member pivotally mounted to and being rotated around the second axis when the seatback is collapsed by the walk-in system;
   a disc member fixed to said reclining means and being rotated around the first axis when the seatback is swung by the reclining means; and
   a link to connect the wire holder member and the disc member so that the wire loosens when the seat-back is swung backward by the reclining means.

3. A car seat according to claim 1, wherein the loosening means includes:
   a wire holder member fixed to said second axis and being rotated when the seat-back is collapsed by the walk-in system, said wire holder member including a sleeve to guide the wire, an end of said wire being attached to the locking mechanism and the other end of said wire being attached to said arm.

4. A car seat according to claim 1, wherein said walk-in system comprises a rod-like striker laterally projected from the side of the seat cushion and a latch swingably attached to the side of the seat cushion and energized toward the striker to hold with the striker, wherein the latch releases the striker when the seat-back is collapsed forward.

* * * * *